(12) United States Patent
Patel et al.

(10) Patent No.: US 11,995,103 B2
(45) Date of Patent: May 28, 2024

(54) DATA SECURITY IN REMOTE STORAGE SYSTEMS STORING DUPLICATE INSTANCES OF DATA

(71) Applicant: International Business Machines Corporation, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/976,690

(22) Filed: Oct. 28, 2022

(65) Prior Publication Data

US 2024/0143624 A1     May 2, 2024

(51) Int. Cl.
*G06F 16/27*     (2019.01)
*H04B 7/185*     (2006.01)

(52) U.S. Cl.
CPC .......... *G06F 16/275* (2019.01); *H04B 7/185* (2013.01)

(58) Field of Classification Search
CPC .................................................... G06F 16/275
USPC ........................................................ 707/610
See application file for complete search history.

(56) References Cited

U.S. PATENT DOCUMENTS

2017/0034250 A1*  2/2017  Sobhani ................ H04W 84/06
2017/0195040 A1   7/2017  Sobhani et al.
2019/0253134 A1*  8/2019  Coleman ............ H04B 7/18519

FOREIGN PATENT DOCUMENTS

| CN | 113067629 A | 7/2021 | |
|---|---|---|---|
| WO | WO-2018170462 A1 * | 9/2018 | ......... H04B 7/18591 |
| WO | 2021034906 A1 | 2/2021 | |
| WO | 2021221736 A2 | 11/2021 | |

OTHER PUBLICATIONS

Huang et al., "Envisioned Wireless Big Data Storage for Low-Earth-Orbit Satellite-Based Cloud," IEEE Wireless Communications, Feb. 2018, pp. 26-31.
Condon, S., "CES 2019: Verizon showcases the potential of 5G with drones, Disney and more," ZDNET, Jan. 8, 2019, 7 pages, retrieved from https://www.zdnet.com/article/ces-2019-verizon-showcases-the-potential-of-5g-with-drones-disney-and-more/.
Tangerman, V., "NASA Is About to Test a Giant Solar Drone That Broadcasts 5G," The-Byte, Mar. 8, 2019, 6 pages, retrieved from https://futurism.com/the-byte/aerovironment-softbank-5g-drone-uav.
Tasevski, S., "5G and Drones," DroneBelow.com, Aug. 31, 2018, 2 pages, retrieved from https://dronebelow.com/2018/08/31/5g-and-drones/.

(Continued)

*Primary Examiner* — Syling Yen
(74) *Attorney, Agent, or Firm* — Zilka-Kotab, P.C.

(57) ABSTRACT

In one general embodiment, a computer-implemented method includes determining when two satellites in low Earth orbit (LEO) and having duplicate instances of data stored thereon will be within a predefined distance of one another. A third satellite is identified to store a replication copy of the instance of data for at least a duration that the two satellites will be within the predefined distance of one another. A copy of the instance of data is caused to be transmitted to the third satellite for storage thereon.

19 Claims, 9 Drawing Sheets

(56) References Cited

OTHER PUBLICATIONS

Samsung, "Samsung, Cisco and Orange Demonstrate 5G-Powered Drone and Industrial Robot at MWC19," Samsung Newsroom, Feb. 26, 2019, 5 pages, retrieved from https://news.samsung.com/global/samsung-cisco-and-orange-demonstrate-5g-powered-drone-and-industrial-robot-at-mwc19.

Patel, N., "The Sky Is the Limit in 5G Game of Drones," eInfochips, Dec. 11, 2019, 7 pages, retrieved from https://www.einfochips.com/blog/sky-limit-5g-game-drones/.

* cited by examiner

DATA SECURITY IN REMOTE STORAGE SYSTEMS STORING DUPLICATE INSTANCES OF DATA

BACKGROUND

The present invention relates to data storage on remote storage systems, and more specifically, this invention relates to maintaining a requisite distance between copies of data for recovery purposes.

Cloud providers appear to be building relationships with satellite companies at a rapid clip, working on two distinctly different objectives. Commercial satellite constellations generate enormous amounts of data which needs to be stored, processed, and analyzed. Meanwhile, the expansion of edge computing beyond traditional terrestrial network connections is driving direct connections between data centers and satellite broadband ground stations to reduce latency and increase application speeds.

A LEO is, as the name suggests, an orbit that is relatively close to Earth's surface. It is normally at an altitude of less than 1000 km but could be as low as 160 km above Earth, which is low compared to other satellite orbits, but still very far above the Earth's surface. Unlike satellites in geosynchronous equatorial orbit (GEO) that must always orbit along Earth's equator, LEO satellites do not always have to follow a particular path around the Earth in the same way. Rather, the planes of their orbits can be tilted relative to the equator. This means there are more available routes for satellites in LEO, which is one of the reasons why LEO is a very commonly used orbit.

Additionally, since the LEO satellites orbit the earth at a much closer distance than traditional orbits, a direct microwave transmission from user devices to the satellites in LEO is possible, which enables many use cases for low orbit satellites. These satellites can be used in the future to transfer the data directly from the user edged devices.

SUMMARY

A computer-implemented method, in accordance with one embodiment, includes determining when two satellites in low Earth orbit (LEO) and having duplicate instances of data stored thereon will be within a predefined distance of one another. A third satellite is identified to store a replication copy of the instance of data for at least a duration that the two satellites will be within the predefined distance of one another. A copy of the instance of data is caused to be transmitted to the third satellite for storage thereon.

A computer-implemented method, in accordance with one embodiment, includes determining when two first satellites in low Earth orbit (LEO) and having duplicate instances of data stored thereon will be within a predefined distance of one another. At least two second satellites are identified to store portions of the instance of data for at least a duration that the two first satellites will be within the predefined distance of one another. Portions of the instance of data are caused to be transmitted to the second satellites for storage of respective portions thereon.

A system, in accordance with one embodiment, includes a processor, and logic integrated with the processor, executable by the processor, or integrated with and executable by the processor, the logic being configured to perform one or both of the foregoing methods.

A computer program product, in accordance with one embodiment, includes one or more computer readable storage media, and program instructions collectively stored on the one or more computer readable storage media. The program instructions include program instructions to perform one or both of the foregoing methods.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for ensuring data security in a constellation of LEO satellites, where redundant instances of data are stored on multiple satellites.

In one general embodiment, a computer-implemented method includes determining when two satellites in low Earth orbit (LEO) and having duplicate instances of data stored thereon will be within a predefined distance of one another. A third satellite is identified to store a replication copy of the instance of data for at least a duration that the two satellites will be within the predefined distance of one another. A copy of the instance of data is caused to be transmitted to the third satellite for storage thereon.

In another general embodiment, a computer-implemented method includes determining when two first satellites in low Earth orbit (LEO) and having duplicate instances of data stored thereon will be within a predefined distance of one another. At least two second satellites are identified to store portions of the instance of data for at least a duration that the two first satellites will be within the predefined distance of one another. Portions of the instance of data are caused to be transmitted to the second satellites for storage of respective portions thereon.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
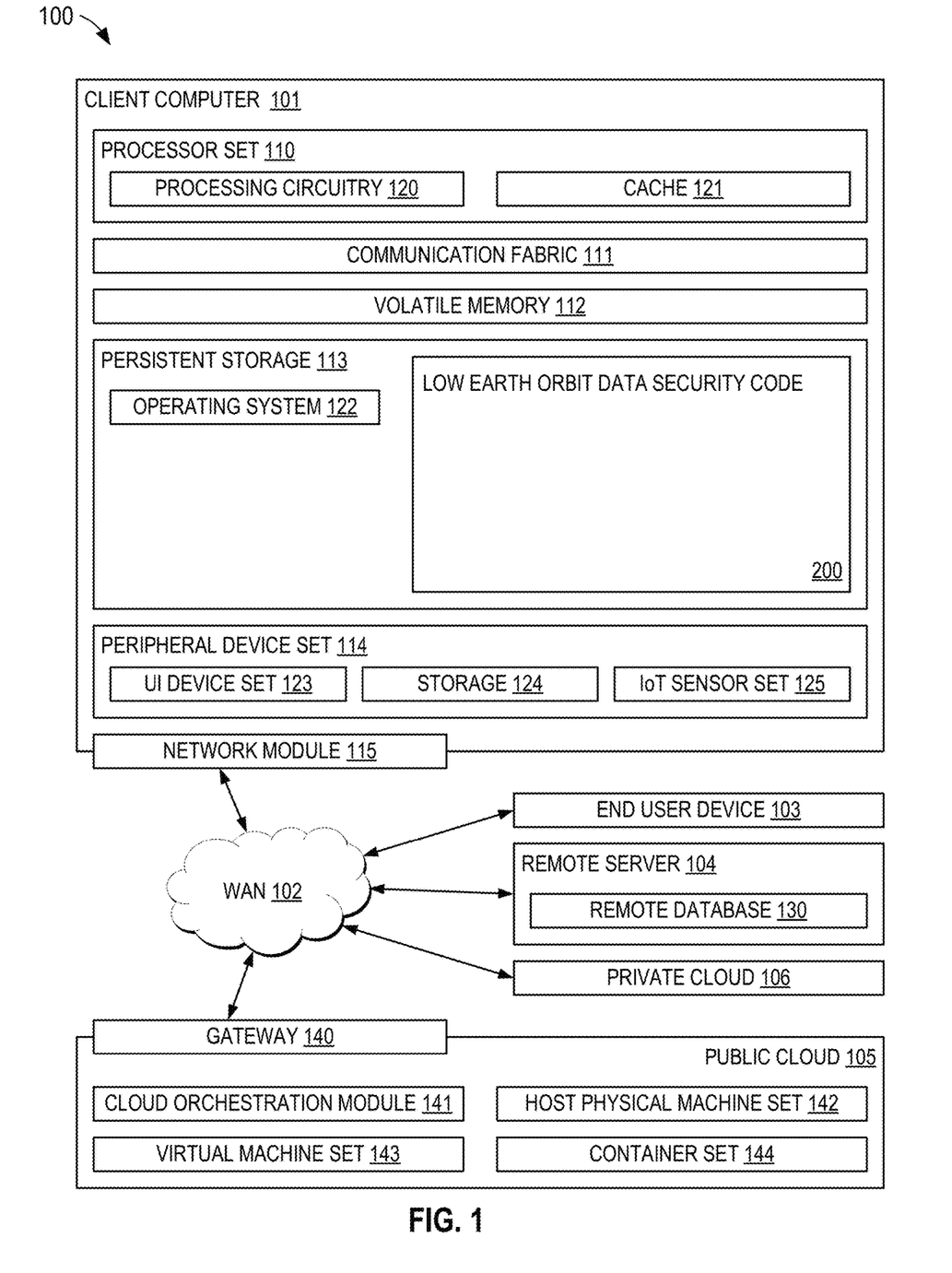
FIG. 1 is a diagram of a computing environment, in accordance with one embodiment of the present invention.

Computing environment 100 contains an example of an environment for the execution of at least some of the computer code involved in performing the inventive methods, such as LEO data security code 200 for performing the methodology described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
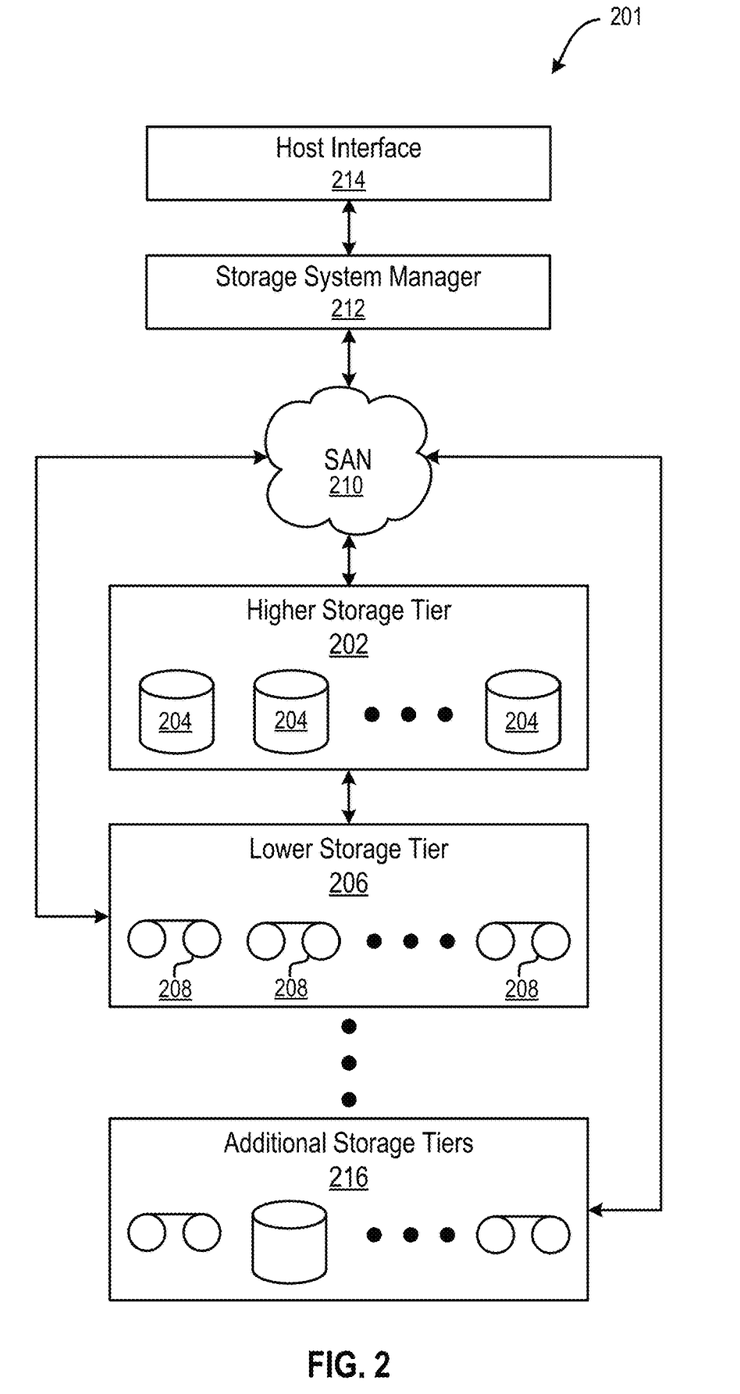
FIG. 2 is a diagram of a tiered data storage system, in accordance with one embodiment of the present invention.

Now referring to FIG. 2, a storage system 201 is shown, according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

Turning now to LEO satellites having satellite-based data centers therein, data is provisioned into one or more of the satellites based on a number of factors such as orbital movement while a LEO satellite is operating as a data center, how to serve the data to and from target applications, etc. As noted above, LEO satellites are not geostationary, and they are not tightly aligned to an equatorial orbit. This allows LEO satellites to move along an orbital path which does not need to be over and along the Earth's equator. Additionally, the speed of travel of the LEO satellite varies depending on its height and the orbital plane. Moreover, the LEO satellite data centers in a constellation may have different orbital planes, having different heights from the center of the earth.

For data security and high availability purposes, data is preferably kept in at least two separate locations in a constellation of LEO satellites. Such locations are generally referred to as primary and disaster recovery (DR) sites. Ideally, a DR site, which keeps replicated copies of instances of data of the primary site, is geographically separated from the primary site, so that the replicated data copies that can be used in case something goes wrong at the primary site, whether it be a natural disaster or manmade at the primary site location. However, because LEO satellites may have nonparallel orbits with respect to each other, if copies are stored on two different LEO satellites for DR purposes, it is likely that the LEO satellites will come closer together sometime during their operational lifespans.

Figure 3:
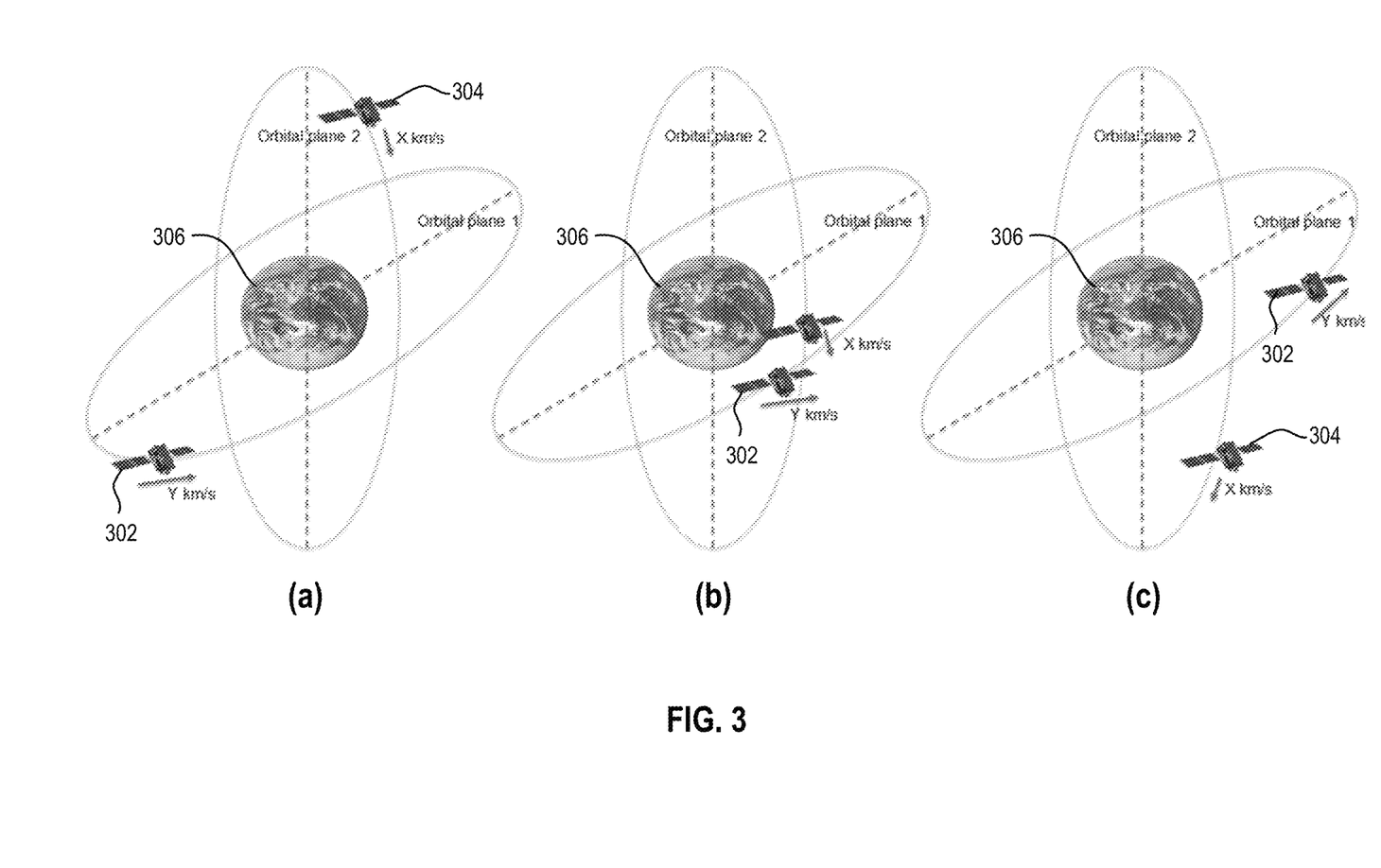
FIG. 3 parts (a)-(c) illustrate the movement of two LEO satellites around the Earth in different orbital planes, and at different velocities, in accordance with one embodiment of the present invention.

FIG. 3 parts (a)-(c) illustrate the movement of two LEO satellites 302, 304 around the Earth 306 in different orbital planes, and at different velocities in km/s. As seen from the Earth, the occurrence of the two LEO satellites 302, 304 approaching each other as in the transition from part (a) to part (b) is very similar to the events of a planetary eclipse. Accordingly, the approach of two LEO satellites orbiting in different planes and/or moving with different speed to within a predefined distance of one another is referred to as an "eclipse" herein. Part (b) of FIG. 3 illustrates an eclipse, where the satellites 302, 304 travel to within a predefined distance of one another. Such an eclipse can cause both (or all) available data copies to become located very close to each other for a short time period, thereby compromising the security of the replicated data. This is because the replicated instances of data are no longer separated by large geographical distances and are thus more vulnerable to a natural or manmade disaster. Hence it becomes important that the replicated data should be kept at "safer" distances irrespective of where the LEO satellites are going.

In addition, when satellites holding the only instances of data eclipse, line of sight between the satellites and approximately one-half of the Earth is lost. Accordingly, the data may be unavailable during the eclipse for applications on the far side of the Earth.

Figure 4:
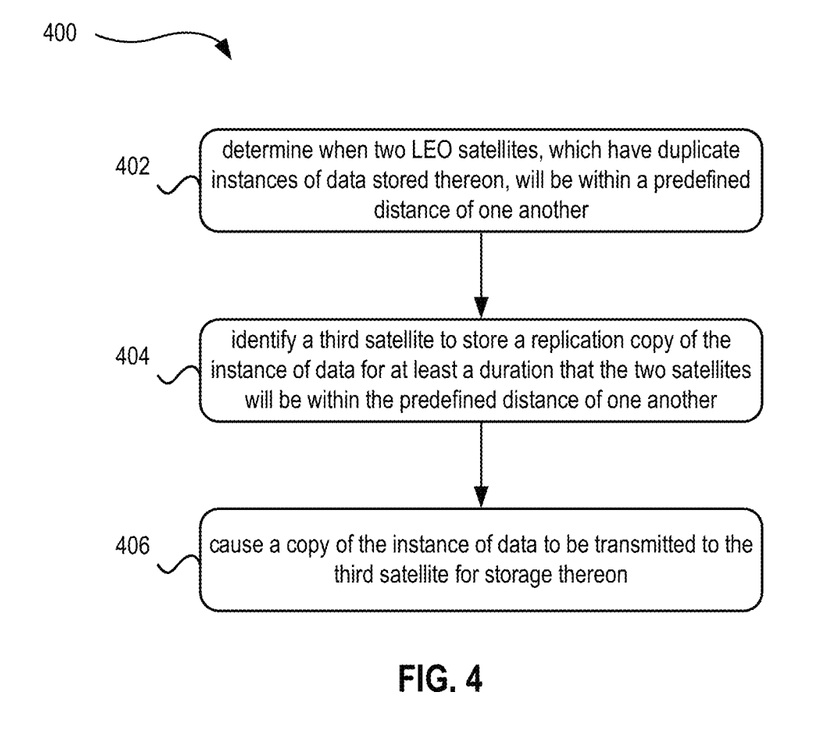
FIG. 4 is a flowchart of a method for securing data when two (or more) satellites having duplicate instances of data will eclipse, in accordance with one embodiment of the present invention.

Now referring to FIG. 4, there is depicted a flowchart of a method 400 for securing data when two (or more) satellites having duplicate instances of data will eclipse, in accordance one embodiment. The method 400 may be performed in accordance with the present invention in any of the environments depicted in FIGS. 1-3 and 5-9, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more of the satellites, a ground station, an orbiting coordinator system, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, in which a determination is made as to when two LEO satellites, which have duplicate instances of data stored thereon, will be within a predefined distance of one another. One satellite holding the main instance of data may be considered the primary site. The other satellite, storing a replication copy of the instance of data, may be considered the DR site.

The satellites may include satellite-based data centers that are capable of storing large quantities of data. In other aspects, the satellites may store smaller amounts of data for any purpose, such as servicing airborne and/or ground based applications. In yet other approaches, the data may be data used primarily by the satellites, e.g., for the satellites themselves and/or for equipment stored on the satellites.

An instance of data may be any type of data. For instance, the instance of data may be a single piece of data such as a file or portion thereof. In other approaches, an instance of data may be a collection of discrete data items, such as a plurality of files. The duplicate instances of data may be identical duplicates, or may be non-identical, e.g., the replication copy has enough information to allow recreation of the main instance of data.

The predefined distance may be any distance. In various approaches, the predefined distance may be defined by a user, an organization, specified by a standard, specified by a governmental agency, etc. In a preferred approach, the predefined distance is determined based on (e.g., defined by) a security policy the specifies a minimum safe distance for the duplicate instances of data.

The determination of when the two satellites will be within the predefined distance of one another may be made using any technique that would become apparent to one skilled in the art after reading the present disclosure. Several examples of making this determination are also provided herein. In one embodiment, the satellite infrastructure application program interfaces (APIs) are used to obtain information from two or more satellites, and potentially the entire constellation of satellites, that assists in making the aforementioned determination. Such information may include current height, orbital plane information, and the average moving speed of the respective satellite. Similarly, location polices may be fetched, e.g., from the satellites, from some other source, etc. to understand the criticality of the various instances of data on the satellites, and the replication relationships to such data (e.g., which instances are primary data that needs to be secure, and where the replication copy thereof is located). With the information received, the geo-specific intersection of the satellites may be determined by calculating the moving speed of the satellite in its respective orbital plane. In some embodiments, a selectively polling thread may be activated to understand the situations when the data copies will come to the same geo area with respect to the Earth's surface or when the data copies will come within a predefined, non-permissible distance.

In one embodiment, a process running on a satellite or other system performing the method 400 is triggered to poll the satellites for the current locations of the data copies. Any event may trigger the polling. For example, the polling may occur in response to application data being placed in a satellite with presence of a high availability replicated data copy on another satellite. Thus, the polling may occur at any time. The results of the polling may be stored in a database for later retrieval.

In response to determining that the two satellites with replicated instances of data will be within the predefined distance of one another, and preferably in view of a determination that the replicated instances of data are of a type that is specified as requiring at least two duplicate instances of data remain farther apart than the predefined distance, a third satellite is identified to store a replication copy of the instance of data for at least a duration that the two satellites will be within the predefined distance of one another. See operation 404.

In one embodiment, depending on these factors, the timelines are identified. When the satellites with the replicated data copies are detected to be too close together and expected to violate the security polices, e.g., after some predefined number of hours, a temporary home for this selective data is identified within the LEO mesh (constellation). The LEO mesh may have multiple satellite data centers, where the method selects the peer satellite that can loan the storage space for the data which needs to be replicated in view of an eclipse. A communication with one of the two satellites may be made to inquire about the size of the data needed to be replicated. Likewise, a communication may be made with the third satellite to determine availability of sufficient storage space inquiry.

In preferred aspects, not all data on the satellite datacenter needs to be replicated. For example, such data may not be security sensitive. Accordingly, only that data which is highly sensitive need be replicated to the third satellite for protection. In this case the movement capacity may be inquired about, and a handshake may be performed with the third satellite for it to loan the space.

In operation 406, a copy of the instance of data is caused to be transmitted to the third satellite for storage thereon. The data is preferably transferred from one of the two satellites via inter-satellite communications, e.g., the satellite in closest proximity to the third satellite, the satellite currently having available system resources to send the instance of data, etc.

In one approach, identifying the third satellite includes selecting the third satellite from among a plurality of candidate satellites based at least in part on the third satellite having sufficient storage space to store the instance of data. For example, the available capacity may be determined, e.g., by contacting (polling) the candidate satellites to return their capacities, reviewing a list of capacities of candidate satellites, etc.

Preferably, the third satellite is identified based at least in part on a location of the third satellite relative to the two satellites and relative travel paths of all three satellites. Criteria for the identification may include whether the third satellite will be in range to receive a copy of the data, whether the third satellite will not itself eclipse with one of the two other satellites during the time when the two satellites are eclipsed, whether the third satellite will be on the other side of the Earth during the eclipse, etc.

After the two satellites are no longer within the predefined distance of one another, the third satellite may discard the instance of data stored thereon. In one approach, an instruction is sent to the third satellite instructing the third satellite to discard the instance of data stored thereon. The instruction can be sent anytime, including before the instance of data is transferred to the third satellite, e.g., specifying a time when the minimum safe distance between the two satellites has been reestablished, etc.

In another approach, the third satellite may automatically discard the data at a predetermined time and/or after expiration of a predetermined amount of time (e.g., 10 minutes, 1 hour, 6 hours, etc.) has elapsed from a relevant start event such as the time of the eclipse, the time that the third satellite received the instance of data, a time specified in metadata accompanying the instance of data, etc.

In one illustrative embodiment, once a connection is made between one of the satellites and the third satellite, the data is transferred to the third satellite. The original copies are preferably kept as they are. Now three data copies are available, so even if two data copies are experiencing an eclipse, there is another copy present which is at a safe distance in order to meet the DR policies for the data. A location polling thread may then poll the two satellites to monitor for the eclipse, and when the orbital pair of satellites are back to the normal distance complying with the relevant policy, then a signal may be sent to the third satellite to discard the data contents and the original two copies will continue to be usable as usual. In the event the instances of data on the two satellites have become unavailable, e.g., because the storage systems in the two satellites were disabled or destroyed, the instance of data may be recovered from the third satellite.

In various exemplary embodiments, the method 400 may be performed in conjunction with satellite-based data centers in LEO (or other non-geostationary) satellites to identify the orbital movement of the underlying satellites to identify eclipses, and in response thereto, perform data placements for improved security and/or for maintaining a high availability of the data.

The system performing the method and appurtenant features described herein may provide many benefits, examples of which follow. In one aspect, the system dynamically detects the need for a critical workload transfer to a LEO satellite location based on collected input streams and autonomously provisions an additional data saving location for more data security. In another aspect, the system may identify an eclipse and provision the additional location(s) for security compliance. In yet another aspect, the system ensures data resiliency in LEO datacenters and offers a secured storage in LEO. In yet another aspect, direct links between LEO satellite data centers are leveraged to copy data. In a further aspect, an optimal data copying procedure is used to avoid multiple back and forth data transmissions between LEO satellites.

IMPLEMENTATION EXAMPLE

Figure 5:
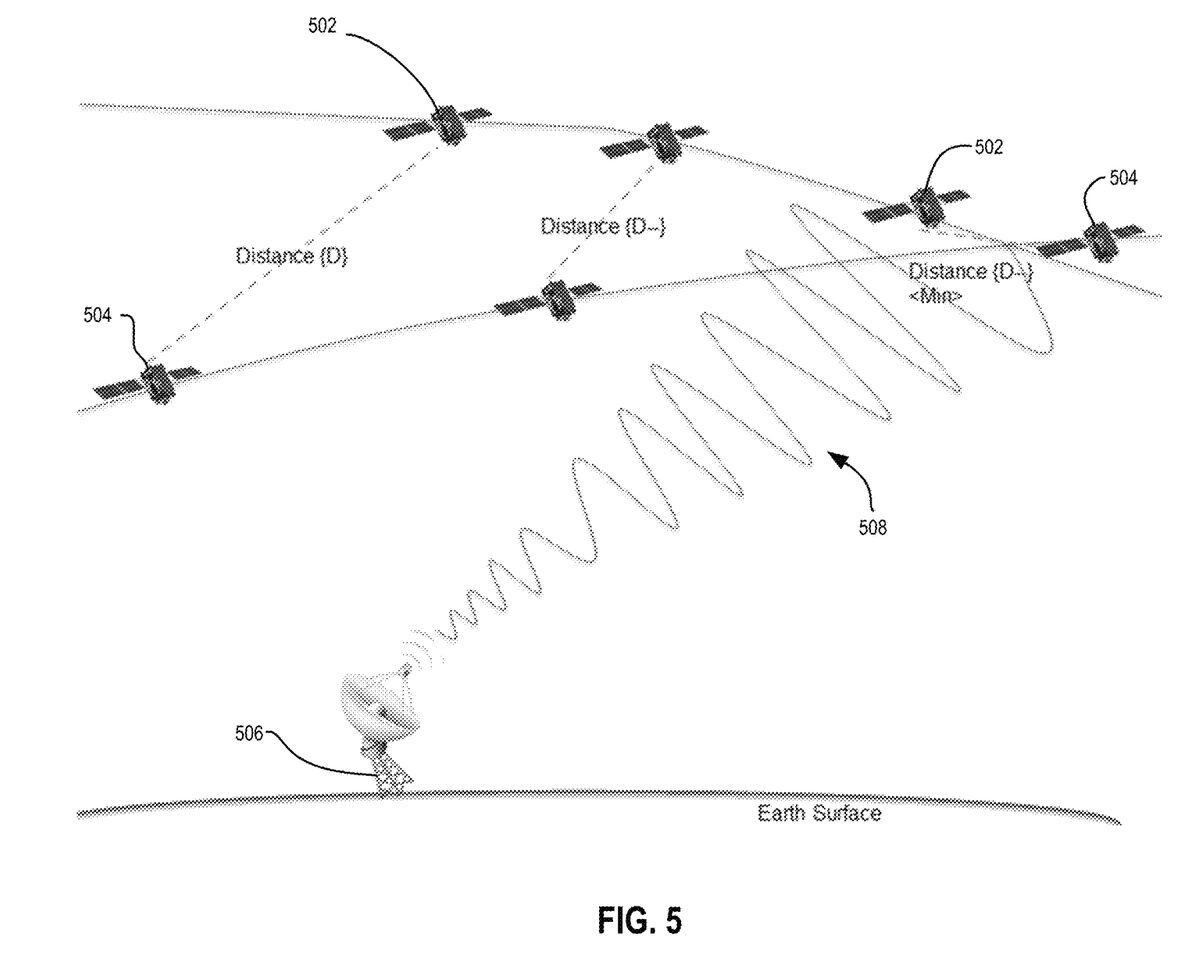
FIG. 5 is a graphical depiction of the progression of two satellites approaching a minimum safe distance, in accordance with one embodiment of the present invention.

FIG. 5 depicts the progression of two satellites 502, 504 approaching a minimum safe distance (Distance (d--<min>). A ground-based communication station 506 is also shown communicating with the satellites via a signal 508.

Figure 6:
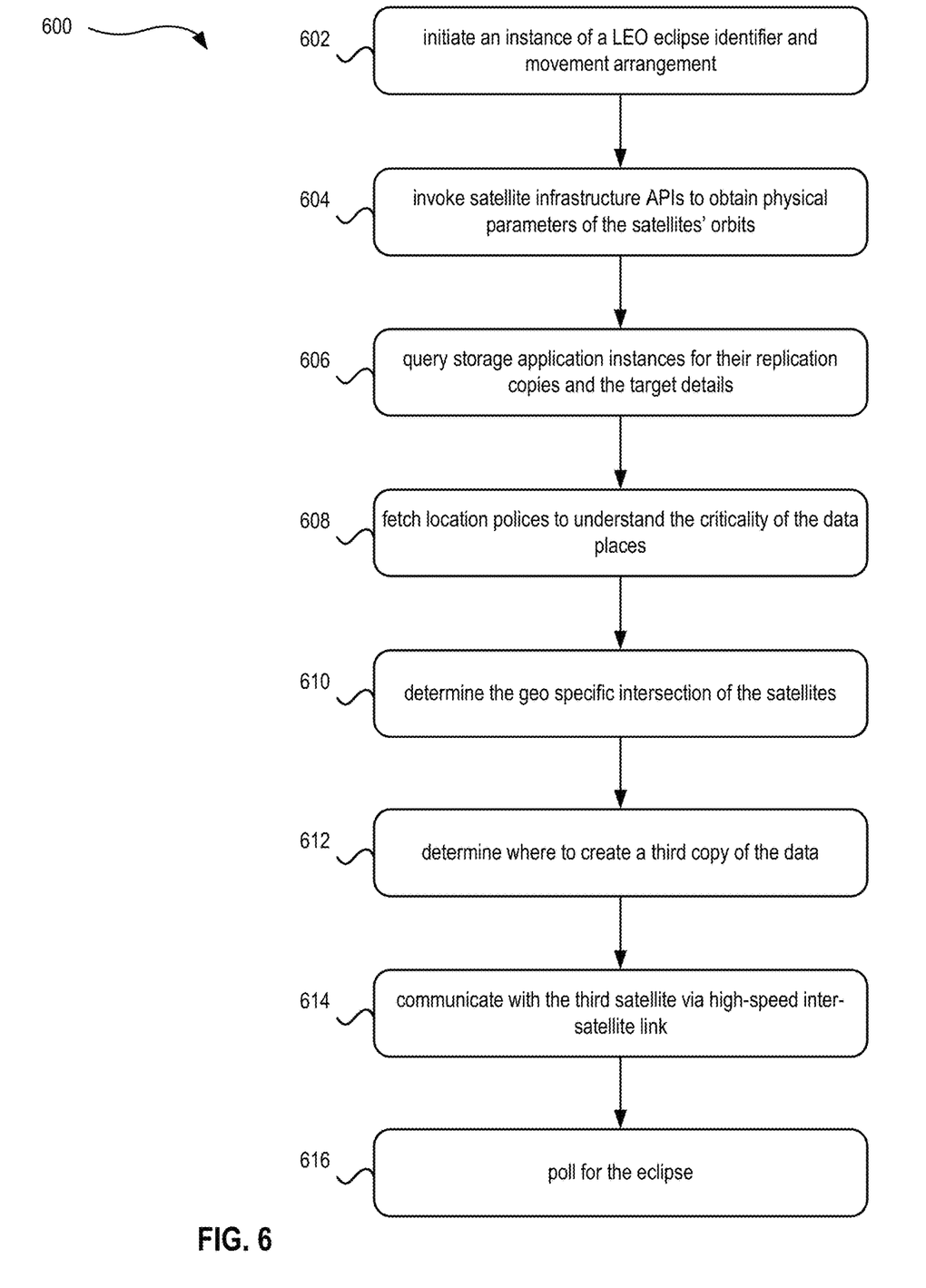
FIG. 6 is a flowchart of a method for securing data when two (or more) satellites having duplicate instances of data will eclipse, in accordance with one embodiment of the present invention.

To maintain proper distance between replicated instances of data, even during an eclipse of the base copies of the data, reference is made to FIG. 6, which depicts a flowchart of an illustrative method 600 for securing data when two (or more) satellites having duplicate instances of data will eclipse, in accordance one embodiment. The method 600 may be performed in accordance with the present invention in any of the environments depicted in FIGS. 1-5 and 7-9, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more of the satellites, a ground station, an orbiting coordinator system, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

In operation 602, an instance of a LEO eclipse identifier and movement arrangement is initiated. Upon instantiation, the data structures are loaded to the service instance, defined data collection resources are triggered to send the data streams, and receiver data locations are identified and provisioned. The service instance comprises the pool of LEO satellite locations that can be used as a temporary home for the data. The list and the capacity may be decoded using known configuration parsing approaches. The appropriate communications with the application storage instances are made and the status is inquired from the storage targets. The required resource capitals are provisioned for the service using insertions to a softwarization management plane and virtual network functions may be triggered to start the data transmission over a communications channel. The LEO infrastructure API instances are initiated, and handshaking is performed that is further used to transmit a data requirement signal and recognition of the event by the orchestration plane.

In operation 604, satellite infrastructure APIs are invoked to obtain physical parameters of the satellites' orbits. Illustrative parameters include current height, orbital plane information, and the average moving speed of the satellite data center.

In operation 606, storage application instances are enquired for their replication copies and the target details. In response to this, the storage instances report the list of LEO satellite(s) where the target copies are located, which are in replication relationship with the base LEO satellite. When this information is received, the process then triggers the inquiry about the same information from the peer process in another LEO satellite holding the replication copy.

In operation 608, location polices are fetched to understand the criticality of the data places. The location policies may include the relationship, synchronous, asynchronous, location policy geopolitical data placement polices, minimum distance policies, etc. The decision can be made for data copying accordingly.

With the information received from current and remote satellites, the geo specific intersection of the satellites is determined in operation 610 by considering, among other things, the moving speed in the respective orbital planes. The selective polling thread is activated. The selective polling thread is used to understand the situations when the data copies come to the same geo area with respect to the Earth's surface or when the data copies are coming within a non-permissible distance. Depending on these factors, the timelines are identified.

When the satellites with the replicated data copies are detected be on a path to become too close and are expected to violate the security polices, e.g., after X hours, then, in operation 612, a determination is made as to where to create a third copy of the data. In this example, the temporary home for the data (third satellite) is identified from the list of available satellites with their capacity for additional data. The replication space requirement is gathered from the storage instances, and list of satellites within range are selected. The list is further verified for their security compliance with respect to the current location and policies.

Figure 7:
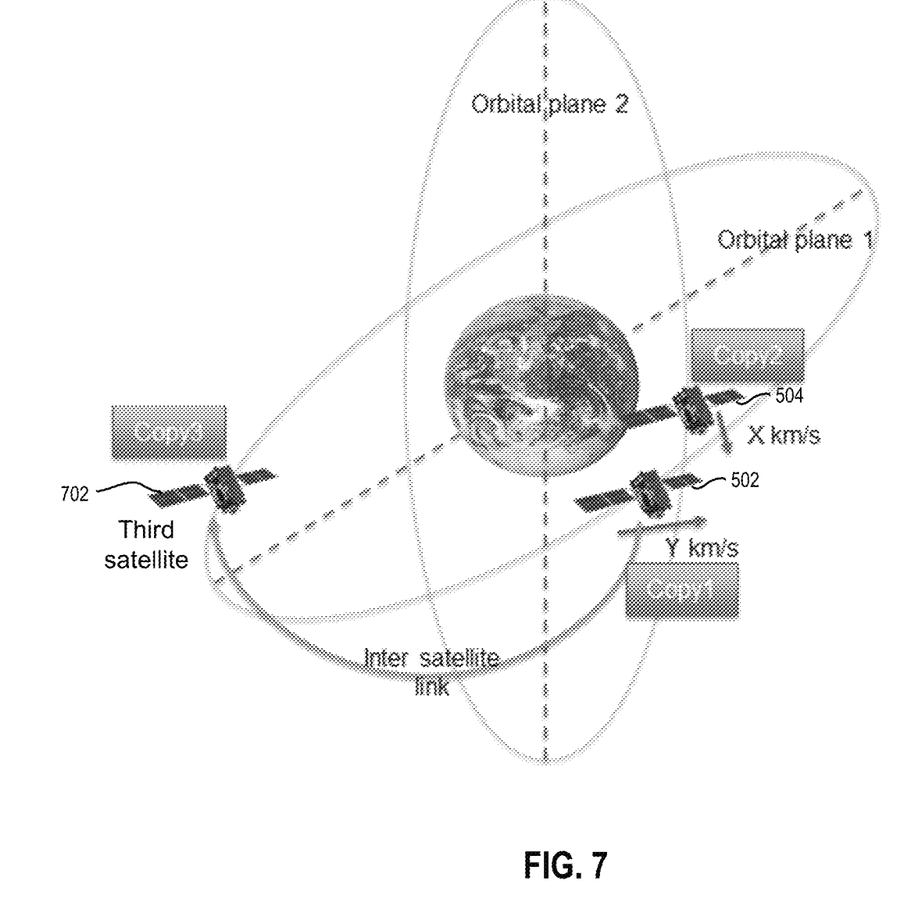
FIG. 7 is a graphical depiction of a communication between one of two satellites and a third satellite via inter-satellite link, in accordance with one embodiment of the present invention.

In operation 614, a communication with the third satellite is made via high-speed inter-satellite link and a storage space inquiry is performed. If the storage space inquiry is answered positively, e.g., there is enough storage space to receive the third copy of the instance of data, the data copy is triggered. The original copies are kept intact. After the data copy is completed, the home locations of the instances of data are notified. FIG. 7 illustrates a communication between one of two satellites 502, 504 and a third satellite 702 via inter-satellite link, thereby creating a third copy (Copy3) of the replicated instances of data (Copy1, Copy2).

In operation 616, the location polling thread polls for the eclipse. When the orbital pair of satellites are back to a distance complying the security policy, a signal is sent to the third satellite to discard the third copy. The original two copies will continue to work as usual.

Figure 8:
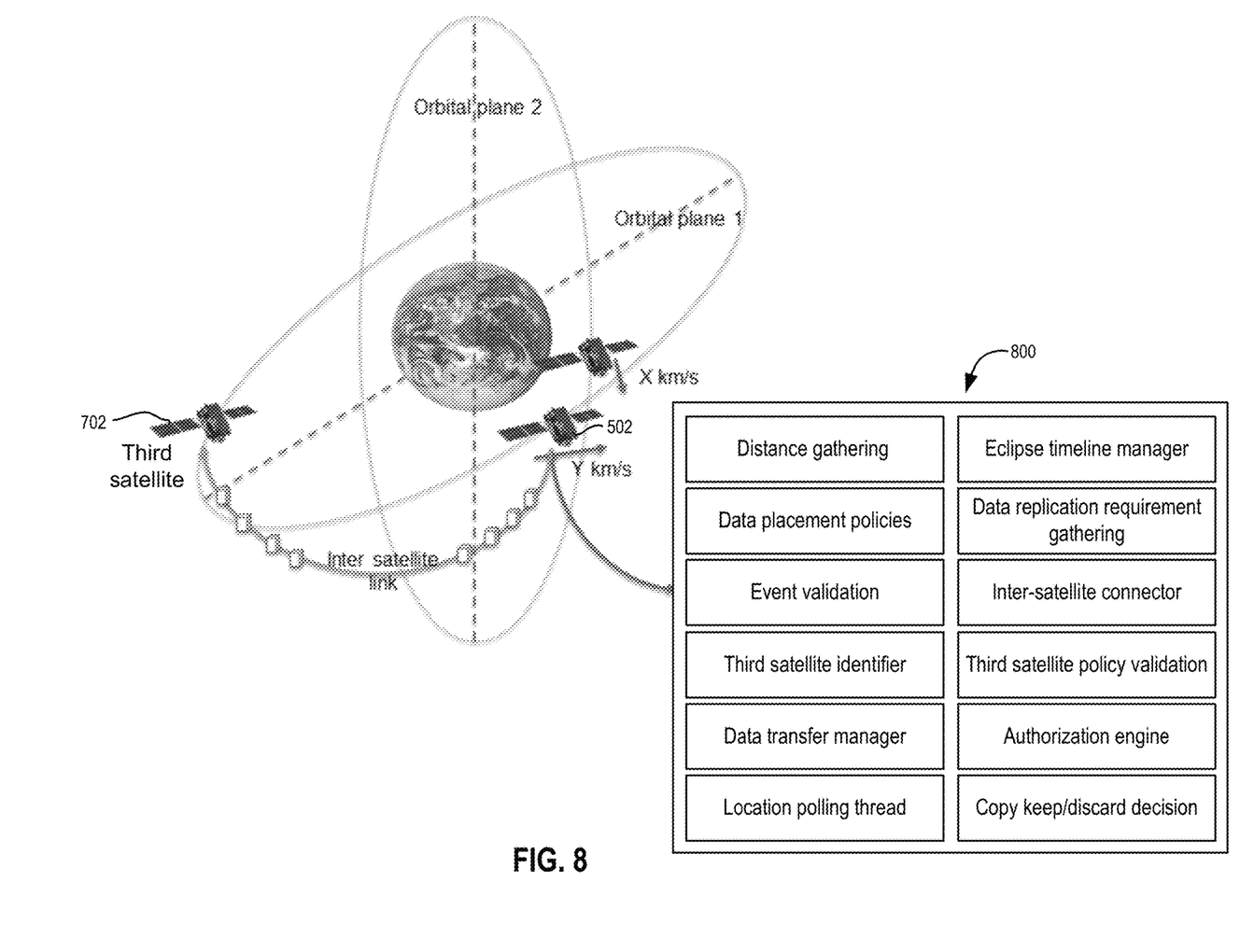
FIG. 8 is a graphical depiction of a satellites and some of the modules used for performing the method of FIG. 6, in accordance with one embodiment of the present invention.

FIG. 8 illustrates some of the modules 800 used for performing the method 600 of FIG. 6. Some or all of the modules may be on satellite 502. In other approaches, the modules may be distributed among multiple satellites and/or terrestrial base station(s).

The modules 800 may perform associated steps of the method 600. The modules may perform any function that would become apparent to one skilled in the art upon reading the present disclosure. Among the modules depicted is a distance gathering module for gathering distance information of the various satellites. A data placement policy module determines data placement policies for instances of the data, e.g., to determine which data needs to be moved to a third satellite. An event validation module validates the data transfer. A third satellite identifier module identifies a third satellite 702 to receive a third copy of the replicated data. A data transfer manager module manages the data transfer to the third satellite. A location polling thread module polls the various satellites for their location information as they travel along their respective orbital planes. An eclipse timeline manager module determines the time of the eclipse of two satellites. A data replication requirement gathering module gathers any needed information to determine which data needs to be replicated to the third satellite. An inter-satellite connector module manages inter-satellite data communications and/or transfer via an inter-satellite link. A third satellite policy validation module validates a policy regarding the third satellite. An authorization engine module determines whether the transfer to the third satellite is authorized. A copy keep/discard module determines whether to instruct the third satellite to keep or discard the third copy of the instance of data after the eclipse has ended.

Figure 9:
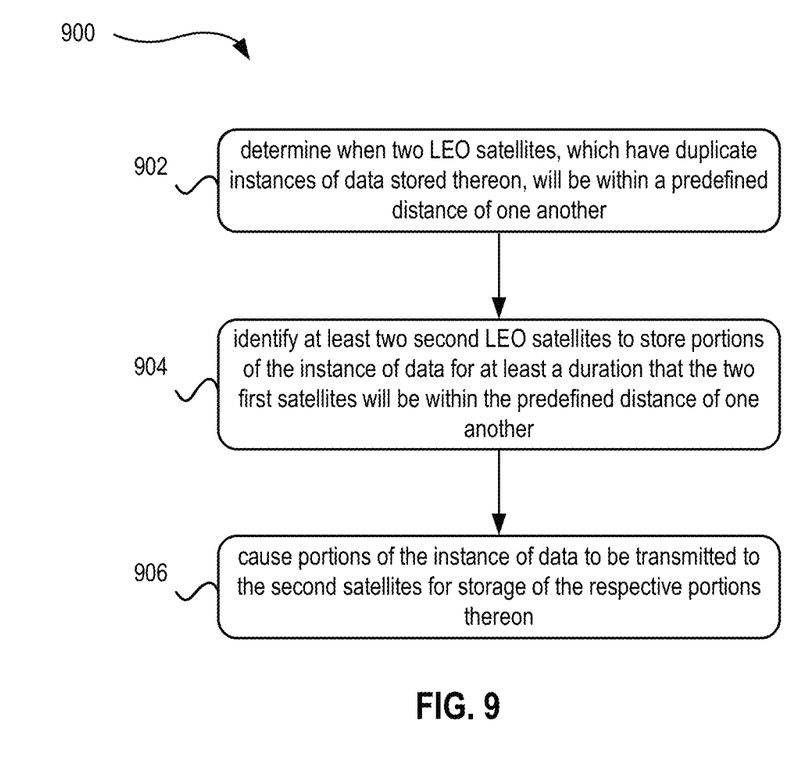
FIG. 9 is a flowchart of a method for securing data when two (or more) satellites having duplicate instances of data will eclipse, in accordance with one embodiment of the present invention.

Now referring to FIG. 9, there is depicted a flowchart of a method 900 for securing data when two (or more) satellites having duplicate instances of data will eclipse, in accordance one embodiment. The method 900 may be performed in accordance with the present invention in any of the environments depicted in FIGS. 1-8 (especially features from the embodiments described with reference to FIG. 4), among others, in various embodiments. Of course, more or fewer operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more of the satellites, a ground station, an orbiting coordinator system, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, in which a determination is made as to when two LEO satellites (e.g., satellite data centers), which have duplicate instances of data stored thereon, will be within a predefined distance of one another. One satellite holding the main instance of data may be considered the primary site. The other satellite, storing a replication copy of the instance of data, may be considered the DR site.

In operation 904, at least two second satellites (e.g., 2, 3, 4, or more second satellites) are identified to store portions of the instance of data for at least a duration that the two first satellites will be within the predefined distance of one another. The second satellites may be in LEO as well.

Separate portions of the instance of data may be stored on respective second satellites for any conceivable reason. For example, if a single second satellite does not have enough storage space to store the entire replication copy, the replication copy may be split into said portions, each portion being sent to a respective second satellite. In another approach, the replication copy may be split into said portions so that no single second satellite has the entire replication copy, e.g., for data security purposes.

In operation 906, portions of the instance of data are caused to be transmitted to the second satellites for storage of respective portions thereon. As in the embodiments described with reference to FIG. 4, any mode of communication may be used, e.g., inter-satellite communications.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining when two satellites in low Earth orbit (LEO) and having duplicate instances of data stored thereon will be within a predefined distance of one another;
   in response to determining when the two satellites in LEO and having duplicate instances of data stored thereon will be within the predefined distance of one another, identifying a third satellite to store a replication copy of the instance of data for at least a duration that the two satellites will be within the predefined distance of one another;
   communicating with the third satellite to inquire about available storage space thereon; and
   causing a copy of the instance of data to be transmitted to the third satellite for storage thereon in response to the third satellite indicating that the third satellite has sufficient storage space thereon to store the instance of data, and prior to the two satellites in LEO and having duplicate instances of data stored thereon coming within the predefined distance of one another.

2. The computer-implemented method of claim 1, wherein the instance of data is sent by at least one of the satellites in LEO to the third satellite via inter-satellite communications.

3. The computer-implemented method of claim 1, wherein the two satellites are satellite data centers.

4. The computer-implemented method of claim 1, wherein identifying the third satellite includes selecting the third satellite from among a plurality of candidate satellites based at least in part on the third satellite having sufficient storage space to store the instance of data.

5. The computer-implemented method of claim 1, wherein the third satellite is identified based at least in part on a location of the third satellite relative to the two satellites and relative travel paths of all three satellites.

6. The computer-implemented method of claim 1, wherein the predefined distance is defined in a security policy specifying a minimum safe distance for the duplicate instances of data.

7. The computer-implemented method of claim 1, comprising sending an instruction for the third satellite to discard the instance of data stored thereon after the two satellites are no longer within the predefined distance of one another.

8. The computer-implemented method of claim 1, comprising recovering the instance of data from the third satellite in response to determining that the instances of data on the two satellites have become unavailable.

9. A system, comprising:
a processor; and
logic integrated with the processor, executable by the processor, or integrated with and executable by the processor, the logic being configured to perform the method of claim 1.

10. A computer program product, the computer program product comprising:
one or more computer readable storage media, and program instructions collectively stored on the one or more computer readable storage media, the program instructions comprising:
program instructions to determine when two satellites in low Earth orbit (LEO) and having duplicate instances of data stored thereon will be within a predefined distance of one another;
program instructions to identify a third satellite to store a replication copy of the instance of data for at least a duration that the two satellites will be within the predefined distance of one another;
program instructions to communicate with the third satellite to inquire about available storage space thereon; and
program instructions to cause a copy of the instance of data to be transmitted from one of the two satellites to the third satellite via inter-satellite communications for storage on the third satellite in response to the third satellite indicating that the third satellite has sufficient storage space thereon to store the instance of data.

11. The computer program product of claim 10, wherein the third satellite is identified in response to determining when the two satellites in LEO and having duplicate instances of data stored thereon will be within the predefined distance of one another, where the instance of data is sent to the third satellite via inter-satellite communications prior to the two satellites in LEO and having duplicate instances of data stored thereon coming within the predefined distance of one another.

12. The computer program product of claim 10, wherein the two satellites are satellite data centers.

13. The computer program product of claim 10, wherein identifying the third satellite includes selecting the third satellite from among a plurality of candidate satellites based at least in part on the third satellite having sufficient storage space to store the instance of data.

14. The computer program product of claim 10, wherein the third satellite is identified based at least in part on a location of the third satellite relative to the two satellites and relative travel paths of all three satellites.

15. The computer program product of claim 10, comprising program instructions to send an instruction for the third satellite to discard the instance of data stored thereon after the two satellites are no longer within the predefined distance of one another.

16. The computer program product of claim 10, comprising program instructions to recover the instance of data from the third satellite in response to determining that the instances of data on the two satellites have become unavailable.

17. A computer-implemented method, comprising:
determining when two first satellites in low Earth orbit (LEO) and having duplicate instances of data stored thereon will be within a predefined distance of one another;
in response to determining when the two first satellites will be within the predefined distance of one another, identifying at least two second satellites to store different portions of the instance of data for at least a duration that the two first satellites will be within the predefined distance of one another;
communicating with the at least two second satellites to inquire about available storage space thereon;
causing a first of the portions of the instance of data to be transmitted to one of the second satellites for storage thereon in response to the one of the second satellites indicating that the one of the second satellites has sufficient storage space thereon to store the first portion of the instance of data; and
causing a second of the portions of the instance of data to be transmitted to another of the second satellites for storage thereon in response to the another of the second satellites indicating that the another of the second satellites has sufficient storage space thereon to store the second portion of the instance of data.

18. The computer-implemented method of claim 17, wherein the portions of the instance of data are sent to the second satellites from at least one of the first satellites via inter-satellite communications.

19. The computer-implemented method of claim 17, wherein the two first satellites are satellite data centers.

\* \* \* \* \*